(No Model.)
W. P. BETTENDORF.
WHEEL SUPPORTING FRAME.
No. 420,761. Patented Feb. 4, 1890.
Fig. 1.
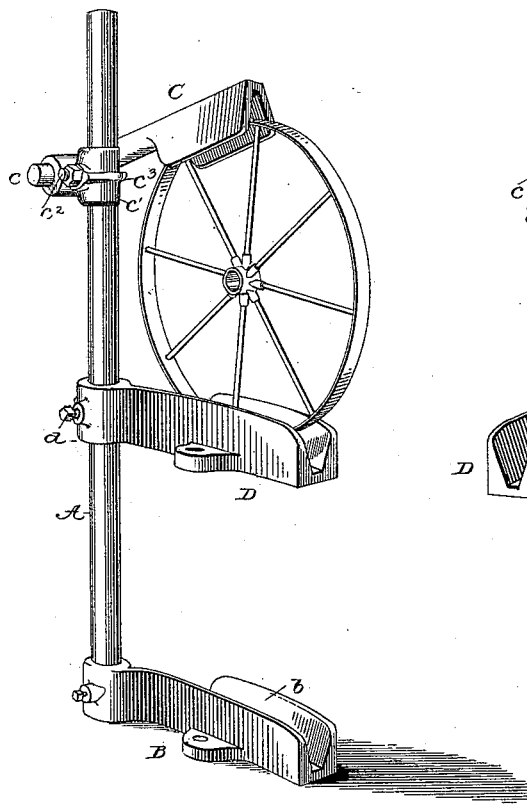
Fig. 2.
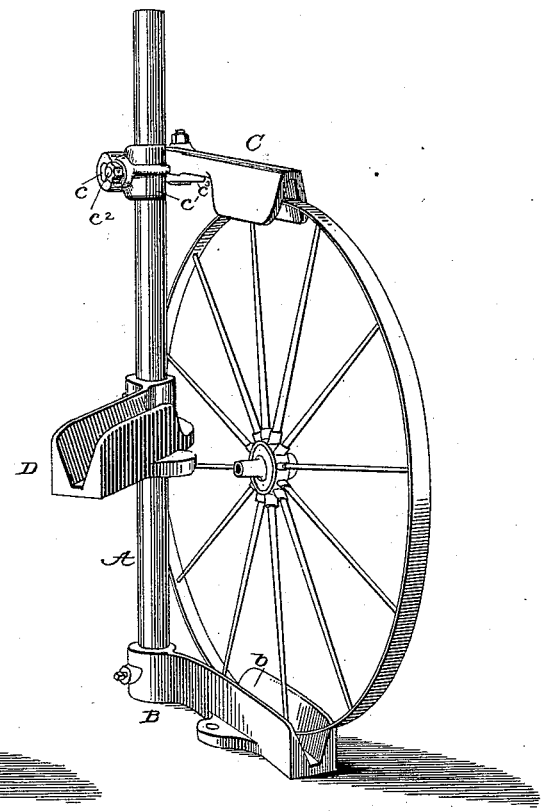
Fig. 3.
on line x-x
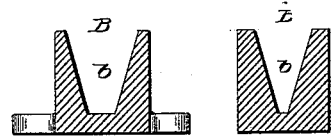
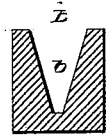
Fig. 4.
on line y-y
Attest:
F. Janly Elmore.
S. P. Hollingsworth.
Fig. 5.
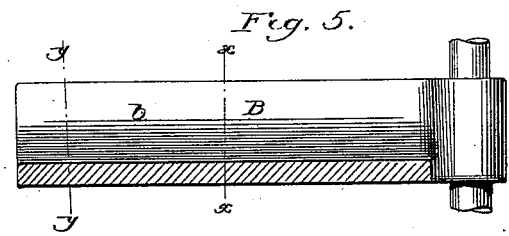
Inventor:
W. P. Bettendorf
G. P. J. Dodge
Atty

UNITED STATES PATENT OFFICE.

WILLIAM P. BETTENDORF, OF DAVENPORT, IOWA.

WHEEL-SUPPORTING FRAME.

SPECIFICATION forming part of Letters Patent No. 420,761, dated February 4, 1890.

Application filed August 8, 1889. Serial No. 320,136. (No model.)

*To all whom it may concern:*

Be it known that I, WILLIAM P. BETTENDORF, of Davenport, in the county of Scott and State of Iowa, have invented certain Improvements in Wheel-Supporting Frames, of which the following is a specification.

In the manufacture of wheels for agricultural implements and other uses, and particularly in the manufacture of wheels composed entirely of metal, it is necessary to provide supports by which they may be firmly held in an upright position and in such manner as to admit of the workman operating upon them at the periphery or elsewhere as the occasion may require.

It is the aim of my invention to provide a simple and inexpensive stand for this purpose—one which may be readily adjusted to receive wheels of different sizes and widths. To this end it consists, essentially, in a suitable standard or support provided with grooved arms to embrace the periphery of the wheel, and also in the peculiar manner of supporting said arms to admit of their being adjusted in different directions.

In the accompanying drawings, Figure 1 is a perspective view of my stand in its preferred form adjusted to hold a small wheel. Fig. 2 is a perspective view of the stand adjusted to hold a wheel of large size. Fig. 3 is a cross-section through one of the clamping-arms on the line $x\,x$ of Fig. 5. Fig. 4 is a longitudinal section of the same on the line $y\,y$ of Fig. 5. Fig. 5 is a longitudinal section of the same.

Referring to the drawings, A represents a rigid standard, preferably of round metal tubing, firmly fixed at its foot in a base-plate B. This base-plate is provided with a longitudinal groove $b$, adapted to receive and retain the lower edge of the wheels. The groove is preferably curved somewhat longitudinally, and is of V form in cross-section in order that it may embrace and retain wheels of varying width on the face or periphery.

C represents an arm attached to the standard and intended to embrace the top of the wheel. It is grooved internally in essentially the same manner as the base-plate to receive and hold the wheel, the groove being, however, on the under instead of the upper side. The upper arm C may be fixed to the standard or other suitable support in any manner which will keep it in position to hold the wheel. I commonly provide it, however, with a horizontal journal $c$, projecting laterally from its rear end through a supporting-sleeve $c'$ on the standard. This sleeve is secured rigidly to the standard by a bolt $c^2$, or similar fastening, which admits of its being raised and lowered to vary the distance between the top arm and the base, according to the diameter of the wheels to be held. I commonly fit the journal of the arm C loosely in its support, so that the arm may fall by gravity upon the wheel, and to prevent it from falling much below the horizontal position I provide the supporting-sleeve with a stop $c^3$, or equivalent device, upon which the arm may rest when relieved from the support which it receives from the wheel.

The wheel may be introduced by first lifting the arm C, then placing the wheel in position, and finally dropping the arm thereon; or, if the parts are suitably adjusted, the wheel may be rolled horizontally into position between the base and the overlying arm.

In order that wheels of small size may be supported at such height as to permit convenient operation upon them, I provide the standard with a second supporting-arm D, adjustably secured thereto by a set-screw $d$ and grooved in its upper face in essentially the same manner as the base-plate, so that wheels may be inserted between it and the upper arm, as shown in Fig. 1.

It is obvious that the base-plate and standard may be varied in form at will, provided only they are adapted to give support to arms grooved or channeled to embrace the periphery of the wheel. It is obvious that the groove in the upper surface of the base-plate may be omitted and the arm D lowered in such position that it will receive wheels of large size; but the employment of the grooved base-plate is preferred, for the reason that it admits of large and heavy wheels being conveniently rolled into position upon it without requiring excessive effort on the part of the operator.

When the base-plate is used in connection with the top arm, the intermediate arm D is turned to one side, as shown in Fig. 2.

The wheel-receiving grooves are preferably offset, as shown in the drawings, in order that the edge of the wheel may be projected beyond the standard, as in Fig. 2, this arrangement avoiding the necessity for arms of extreme length and allowing the wheel to be more firmly held than would otherwise be possible.

My stand or support is found particularly useful in holding wheels immediately after the ends of their rims have been welded together and while they are being finished by the removal of the burrs or inequalities produced by the welding action.

Having thus described my invention, what I claim is—

1. A temporary support for wheels, comprising a frame or standard, a grooved plate to embrace the lower edge of the wheel, and a grooved plate to receive the upper edge of the wheel.

2. The grooved base-plate, the standard, and the grooved arm C, combined substantially as described and shown.

3. The grooved base-plate, the standard fixed thereto, the vertically-adjustable sleeve upon the standard, and the wheel-confining arm journaled to the sleeve to swing vertically.

4. In a support for wheels, the grooved base-plate, the standard, the grooved arm at the top of the standard, and the intermediate grooved arm adapted to be turned horizontally out of its operative position.

5. A temporary support for wheels, comprising as its essential elements a frame or standard and two opposing arms or plates adapted to embrace and retain the wheel between them.

In testimony whereof I hereunto set my hand, this 27th day of July, 1889, in the presence of two attesting witnesses.

WILLIAM P. BETTENDORF.

Witnesses:
T. B. CARSON,
G. WATSON FRENCH.